United States Patent [19]
Oono et al.

[11] Patent Number: 5,860,031
[45] Date of Patent: Jan. 12, 1999

[54] ZOOM ELECTRONIC CAMERA

[75] Inventors: Masahiro Oono, Saitama-ken; Hisao Iwanade, Tokyo; Noboru Saitoh, Saitama-ken; Koji Sato, Saitama-ken; Sukenori Shiba, Saitama-ken; Tatsuya Yoshida, Saitama-ken; Nobuyuki Nagai, Saitama-ken, all of Japan

[73] Assignee: Asahi Kogaku Kogyo Kabushiki Kaisha, Tokyo, Japan

[21] Appl. No.: 989,818

[22] Filed: Dec. 12, 1997

[30] Foreign Application Priority Data

Dec. 17, 1996 [JP] Japan .................................. 8-337130

[51] Int. Cl.⁶ .................................................. G03B 17/00
[52] U.S. Cl. .............................................................. 396/85
[58] Field of Search ................... 396/85–87, 72; 348/358

[56] References Cited

U.S. PATENT DOCUMENTS 5,592,250  1/1997  Shimizu .............................. 396/85 X

*Primary Examiner*—W. B. Perkey
*Attorney, Agent, or Firm*—Greenblum & Bernstein, P.L.C.

[57] ABSTRACT

A zoom electronic camera comprising a lens casing which contains therein a zoom lens having at least two movable zooming lens groups, a drive mechanism including a motor for driving the movable zooming lens groups, a solid state image pickup device which picks up an object image through the zoom lens, a lens CPU which controls the drive mechanism including the motor, and a body casing which contains therein a signal processing circuit which processes an image signal supplied from the solid state image pickup device and which is relatively rotatably connected to the lens casing through a cylindrical portion about which the relative rotation takes place. The zoom lens, the drive mechanism including the motor and the solid state image pickup device are located on the side of the cylindrical portion opposite to the lens CPU.

7 Claims, 18 Drawing Sheets

ZOOM ELECTRONIC CAMERA

BACKGROUND OF THE INVENTION

1. Field of the Invention

The present invention relates to an electronic camera in which an object image is picked up by a solid state image pickup device, and in particular it relates to a zoom electronic camera having a zoom lens in which a lens casing is rotatable with respect to a body casing.

2. Description of the Related Art

In a known electronic camera such as a digital camera or video camera, etc., the lens casing (casing on the lens side) is rotatable with respect to the body casing (casing on the body side), so that the freedom to determine the image pickup position can be increased without moving the body casing. Moreover, a zoom electronic camera which is equipped with a zoom lens is also known.

In such a zoom electronic camera, image signals are supplied from the solid state image pickup device provided in the lens casing to a signal processing circuit provided in the body casing through an FPC board. The zoom lens is controlled through the FPC board. In the conventional zoom electronic camera, the CPU which controls the zoom lens is provided in the camera body and the control signal is supplied from the CPU to the lens. However, it is preferable that a lens CPU be provided in the lens casing to carry out a precise control of the zoom lens.

SUMMARY OF THE INVENTION

It is an object of the present invention to provide a zoom electronic camera having a lens CPU in the lens casing wherein the lens CPU is arranged so that it tends not to receive noise which causes a mal-function.

As mentioned above, in the conventional apparatus, the body-lens connecting FPC board which electrically connects the electric or electronic elements within the lens casing and those within the body casing extends through the hollow shaft (cylindrical portion) about which the lens casing is rotatable with respect to the lens casing. The basic concept of the present invention resides in the arrangement in which the lens CPU is opposed to the elements associated with the zoom lens, having the drive mechanism including the motor which causes noise, with respect to the cylindrical portion, so that the lens CPU can be separated from the source of noise.

Namely, according to the present invention, there is provided a zoom electronic camera comprising a lens casing which contains therein a zoom lens having at least two movable zooming lens groups, a drive mechanism including a motor for driving the movable zooming lens groups, a solid state image pickup device which picks up an object image through the zoom lens, a lens CPU which controls the drive mechanism including the motor, and a body casing which contains therein a signal processing circuit which processes an image signal supplied from the solid state image pickup device and which is relatively rotatably connected to the lens casing through a cylindrical portion about which the relative rotation takes place. The zoom lens, the drive mechanism including the motor and the solid state image pickup device are located on the side of the cylindrical portion opposite to the lens CPU.

The expression "on the side of the cylindrical portion opposite to the lens CPU" refers to the arrangement in which the associated elements are opposed to the lens CPU with respect to an axis (or plane) passing through the center of the cylindrical portion. Namely, the zoom lens, the drive mechanism including the motor and the solid state image pickup device are located above the cylindrical portion and the lens CPU is located below the cylindrical portion.

The cylindrical portion can be provided with a body-lens connecting FPC board extending therethrough, which electrically connects electric or electronic elements within the lens casing and electric or electronic elements within the body casing. The body-lens connecting FPC board extending through the cylindrical portion is connected to the lens CPU, the solid state image pickup device and a drive circuit of the motor.

To facilitate the assembling operation, the lens casing is provided therein with an internal lens FPC board, so that the body-lens connecting FPC board is connected to the internal lens FPC board and a substrate on which the solid state image pickup device is mounted through respective connectors. Preferably, the connector of the substrate and the connector of the internal lens FPC board are located on the same side of the cylindrical portion as the lens CPU. Namely, the substrate of the solid state image pickup device extends from one side of the cylindrical portion on which the zoom lens is located to the other side thereof on which the lens CPU is located.

The present disclosure relates to subject matter contained in Japanese Pat. Application No.8-337130 (filed on Dec. 17, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 6:
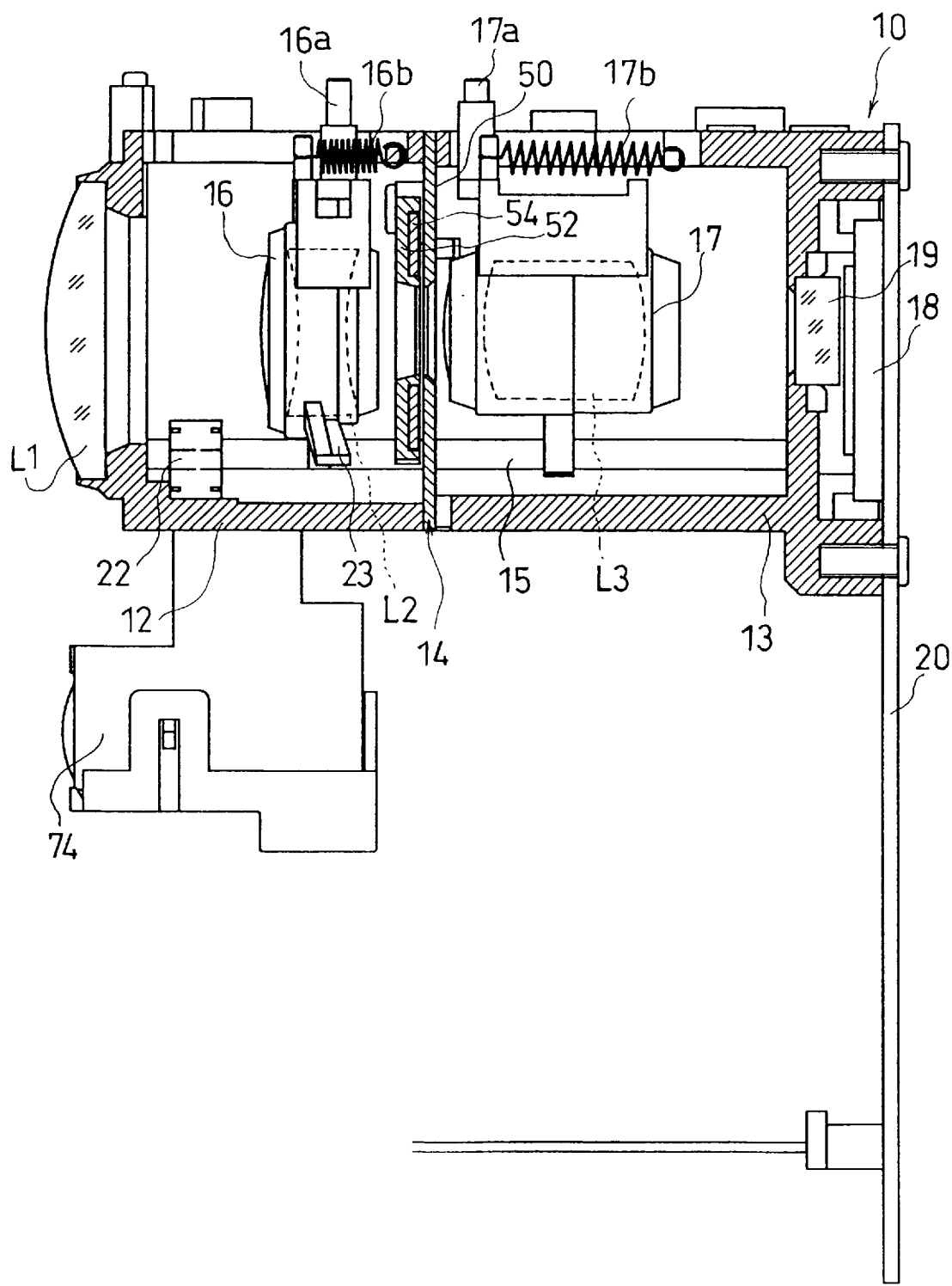
FIG. 6 is a longitudinal sectional view of FIG. 5 at a telephoto extremity.
Figure 7:
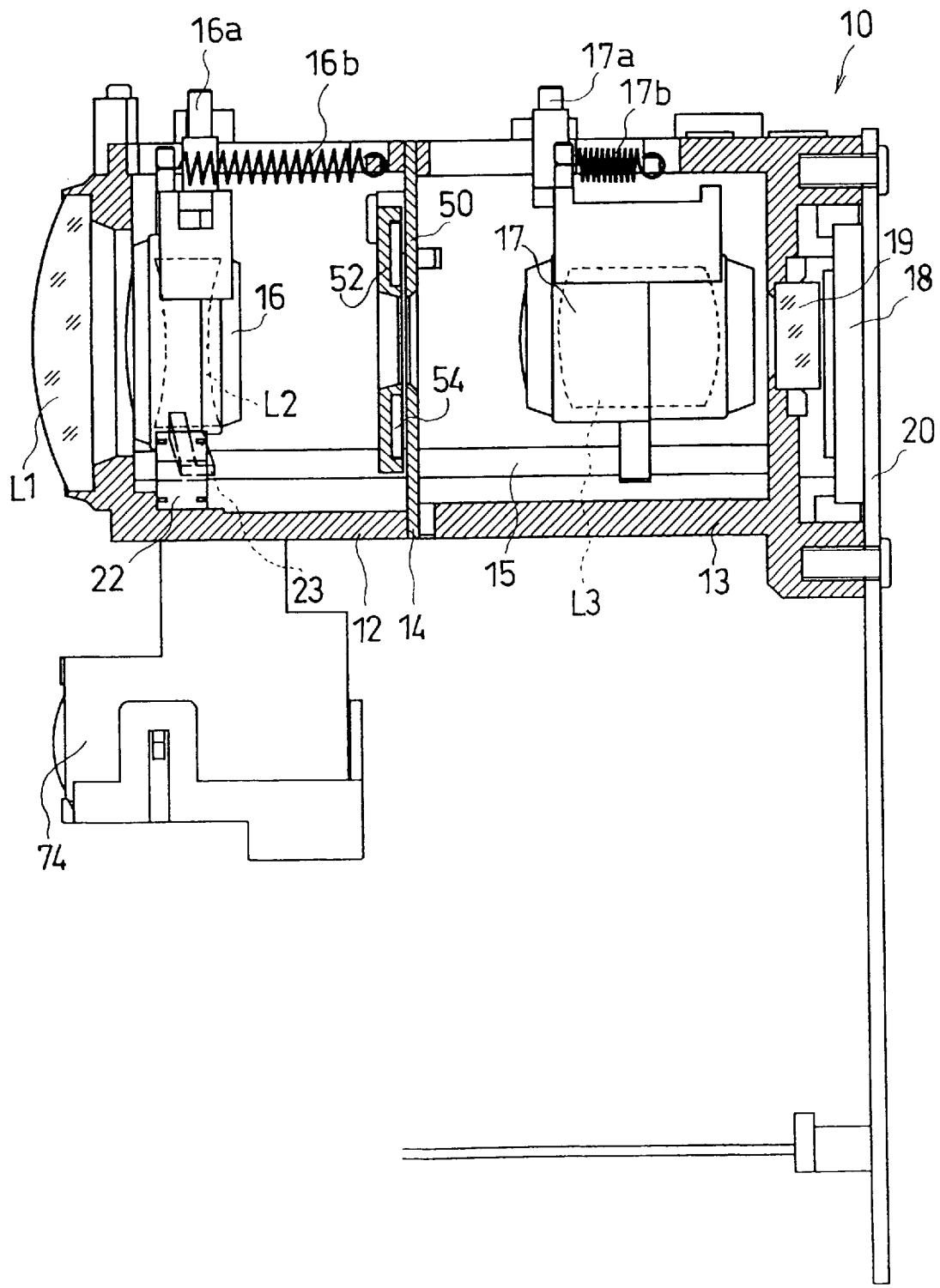
FIG. 7 is a longitudinal sectional view of FIG. 5 at a wide-angle extremity.
Figure 8:
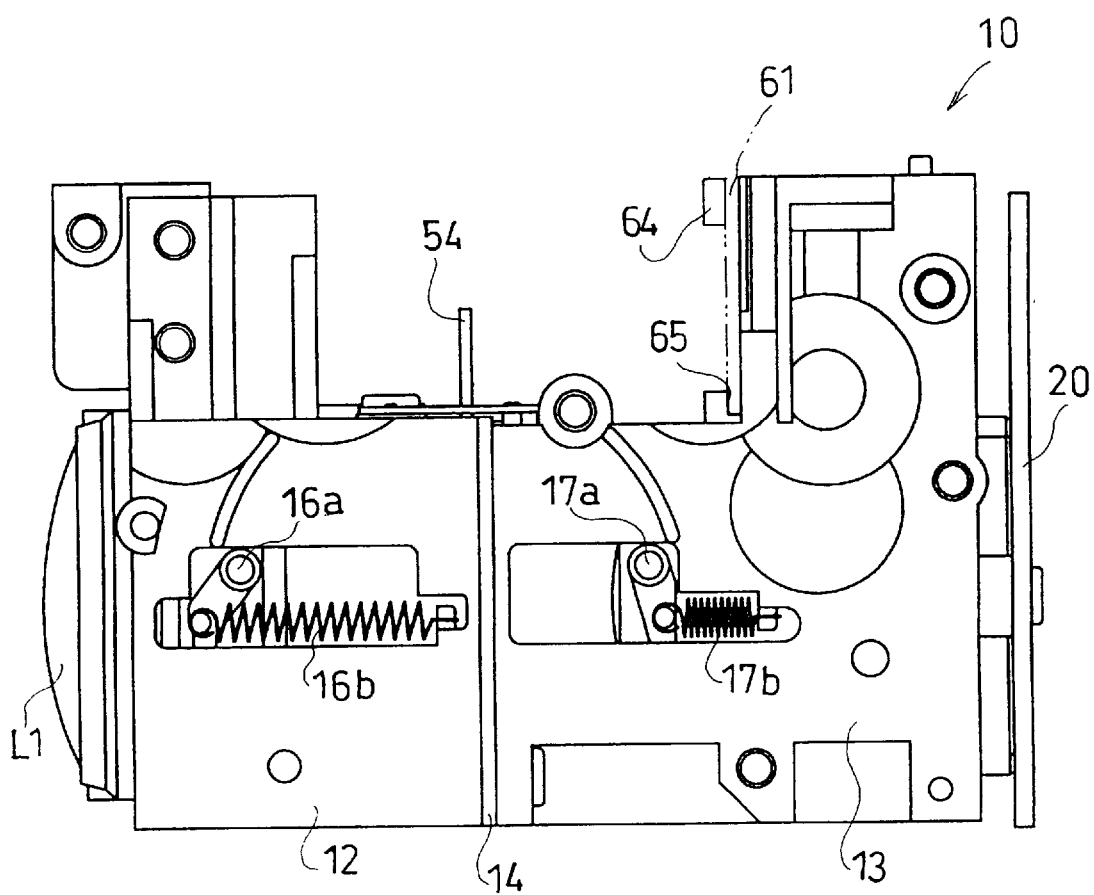
FIG. 8 is an end view viewed from the direction indicated by an arrow VIII in FIG. 5.

A zoom lens barrel according to an embodiment of the present invention is applied to a digital camera using a CCD. The zoom lens system is comprised of three lens groups consisting of a first stationary lens group L1 of positive power, a second movable lens group L2 of negative power, and a third lens group L3 of positive power, as shown in FIGS. 6 and 7. The zoom lens system constitutes a variable focus lens in which the zooming operation is carried out by moving the second and third lens groups L2 and L3, and the focusing operation is carried out by moving the second lens group L2. However, no cam groove is used to effect the position control of the second and third lens groups L2 and L3. Namely, the position of the second lens group L2 is controlled, in accordance with set focal length information (data) and detected objected distance information (data) using an open-loop control system, while the position of the third lens group L3 is controlled using a closed-loop control system.

Figure 4:
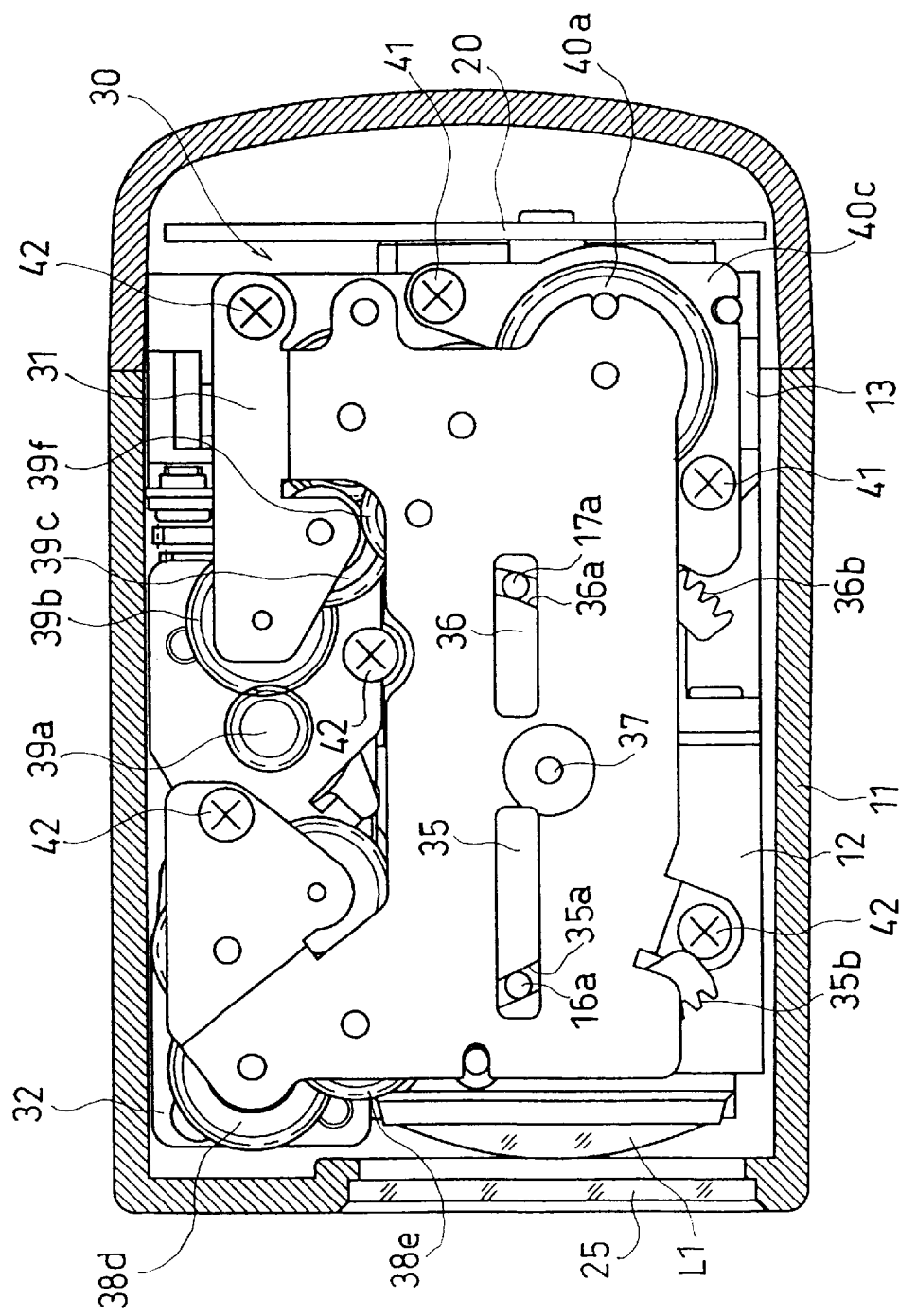
FIG. 4 is a sectional view taken along the line IV—IV in FIG. 1.
Figure 5:
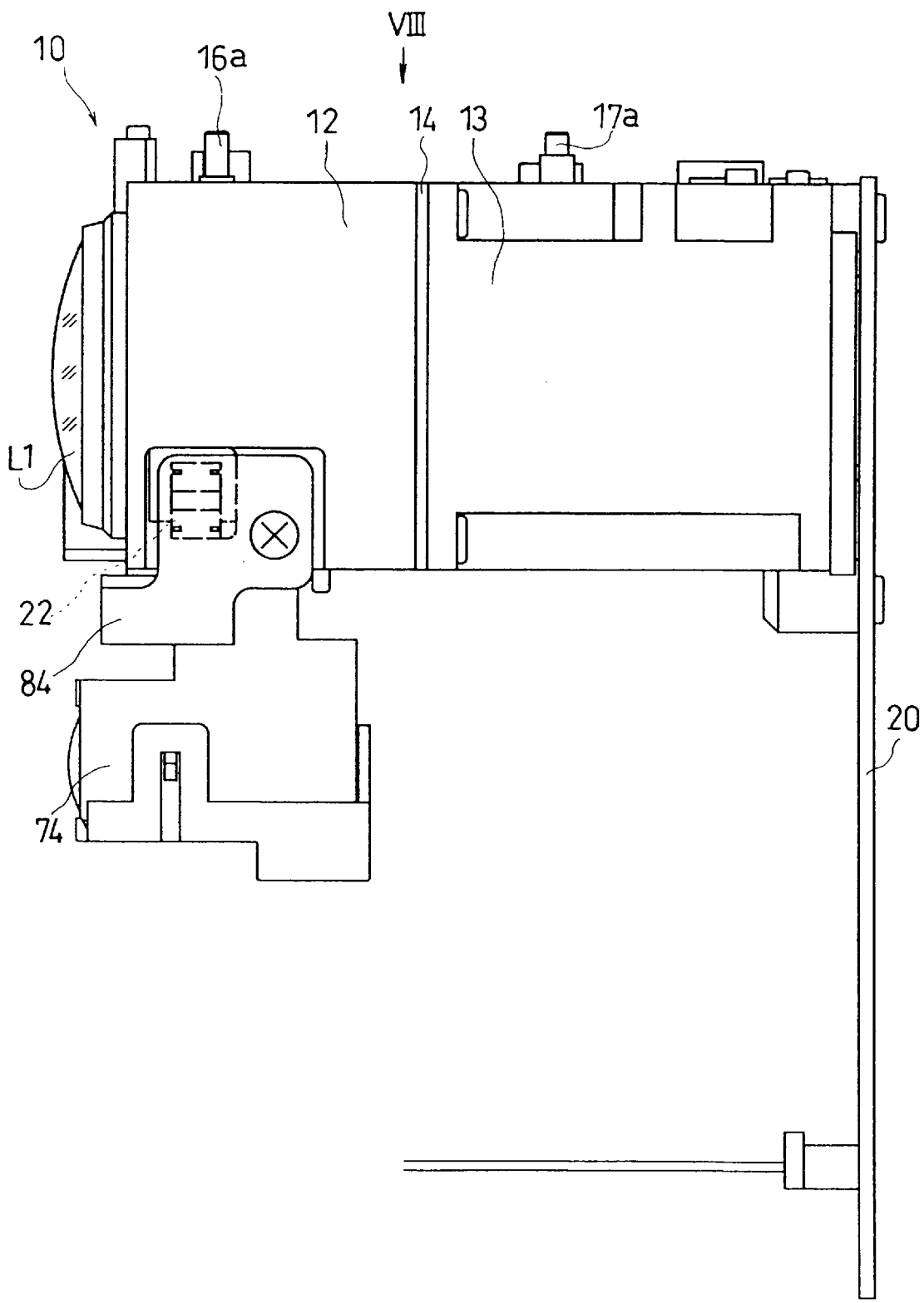
FIG. 5 is a left side view of a lens barrel body before a lens drive unit is incorporated.
Figure 9:
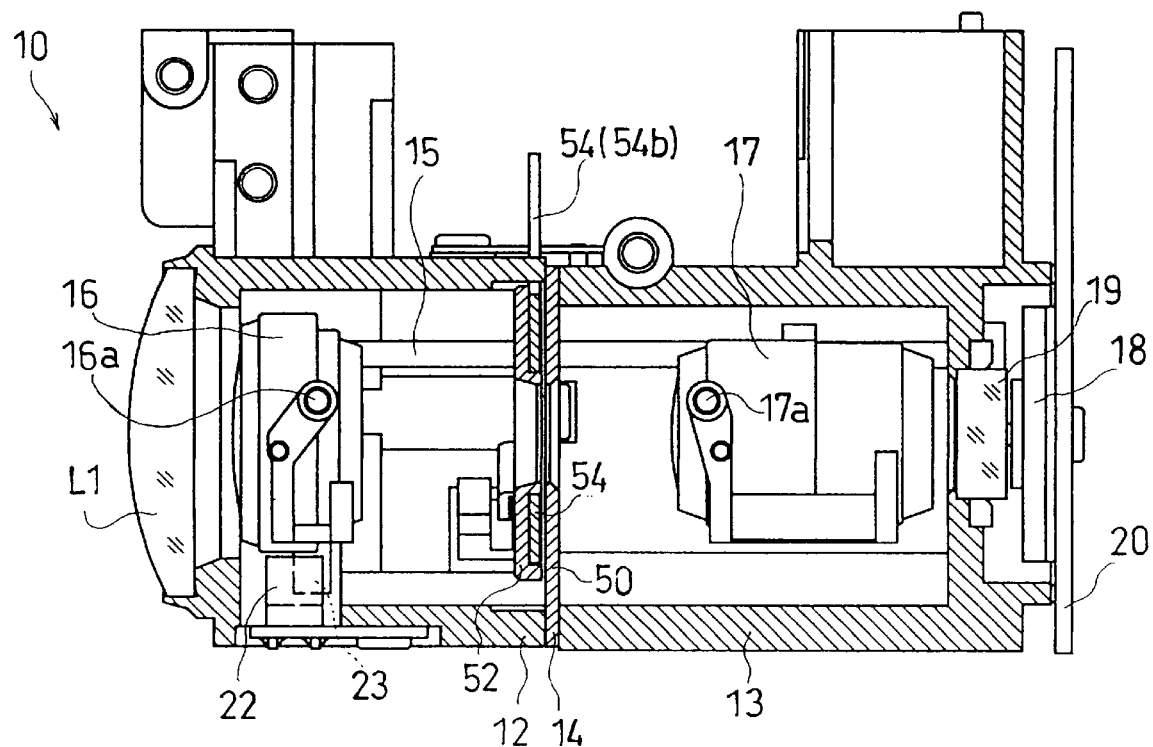
FIG. 9 is a cross sectional view of FIG. 8.

As may be seen in FIGS. 5 through 9, the lens barrel body 10 located in the lens casing 11 is composed of a front plastic body 12, a rear plastic body 13, and a diaphragm block 14 held between the front and rear plastic bodies 12 and 13. There are a plurality of guide rods 15 (only one rod is shown in FIGS. 6, 7 and 9) extending between the front and rear bodies 12 and 13 in parallel with the optical axis. A second lens frame 16 which holds the second lens group L2, and a third lens frame 17 which holds the third lens group L3, each are movable, guided by the guide rods 15. The CCD (image pickup device) 18 is provided behind the third lens frame 17 and is provided with a substrate 20 secured to the rear body 13. A crystal filter 19 is provided between the third lens frame 17 and the CCD 18. The casing 11 is provided with a glass cover (plane-parallel plate) 25 (FIGS. 1, 2 and 4) secured thereto and provided in front of the first lens group L1.

The second lens frame 16 and the third lens frame 17 are respectively provided with upwardly extending second and third lens pins 16a and 17a. The second and third lens frames 16 and 17 are biased rearwardly (toward the CCD 18) by tension springs 16b and 17b, respectively, for removing backlash.

The front body 12 is provided with a photodetector (origin sensor) 22 to detect the origin of the second lens frame 16 (second lens group L2). The second lens frame 16 is equipped with a tab plate 23 secured thereto to cooperate with the photodetector 22. In the illustrated embodiment, the origin of the second lens group L2 corresponds to an infinite object distance at the wide-angle extremity. When the second lens group L2 is located at the origin, the tab plate 23 interrupts the light from the photodetector 22 to detect the origin. The displacement of the second lens group L2 from the origin is controlled by a lens controller (CPU) 70 (FIG. 18) which controls the number of driving pulses of a second lens pulse motor M2 (which drives the second lens group L2). Alternatively, it is also possible to control the displacement of the second lens group L2 from the origin using a pulser.

As may be supposed from the telephoto position shown in FIG. 6 and the wide-angle position shown in FIG. 7, when the focal length varies from the telephoto extremity toward the wide-angle extremity, the second lens frame 16 (second lens group L2) is moved forward and the third lens frame 17 (third lens group L3) is moved rearward. Namely, when the focal length is changed, the second and third lens frames 16 and 17 (second and third lens groups L2 and L3) are moved in opposite directions.

A lens drive mechanism 30 which drives the second lens frame 16 and the third lens frame 17 in the lens barrel body 10 is assembled as a lens drive unit which is attached to bridge the front body 12 and the rear body 13. The lens drive unit 30 will be discussed below with reference to FIGS. 1 through 4 and FIGS. 10 through 13.

Figure 10:
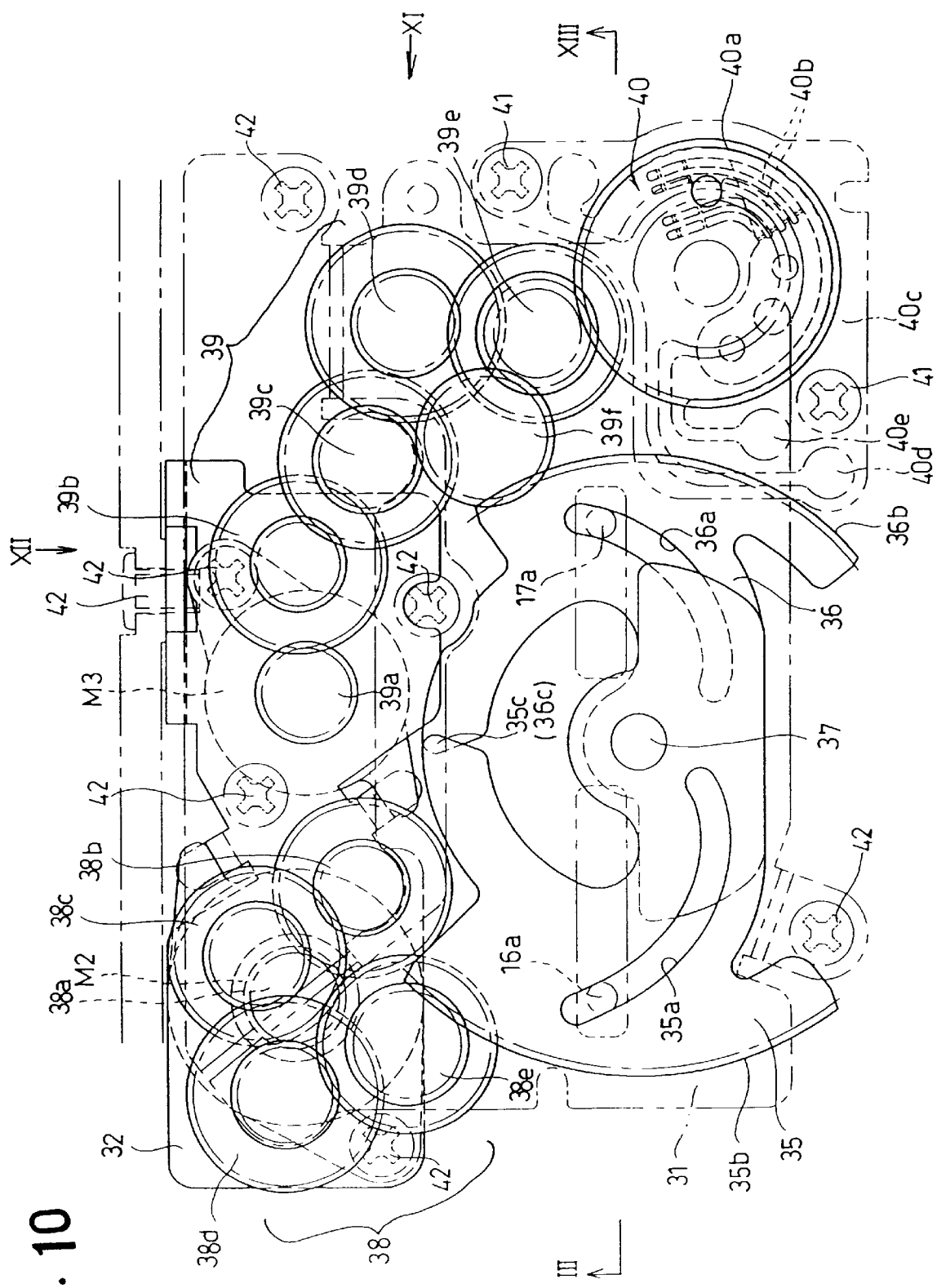
FIG. 10 is a plan view of a lens drive unit.
Figure 11:
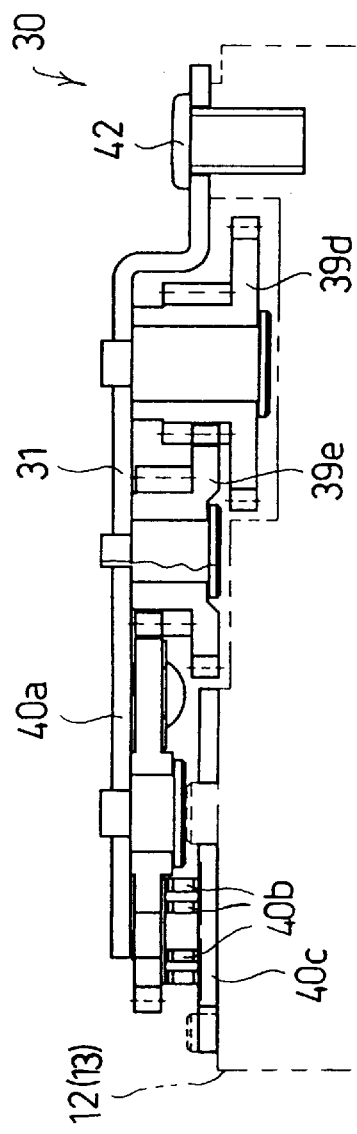
FIG. 11 is an end view viewed from the direction indicated by an arrow XI in FIG. 10.

The lens drive unit 30 is provided with first and second mother plates 31 and 32 which lie stepwise in different heights. In FIG. 10, for clarity, the upper first mother plate 31 is indicated by a dotted line and the lower second mother plate 32 is indicated by a solid line. The second lens pulse motor M2 and a third lens motor M3 are secured to the lower surface of the lower mother plate 32 so that the drive shafts of the motors M2 and M3 extend in a direction perpendicular to the second mother plate 32. A second-lens drive plate 35 is provided with a cam groove (lead groove) 35a in which the second lens cam pin 16a of the second lens frame 16 is fitted. A third-lens drive plate 36 is provided with a cam groove (lead groove) 36a in which the third lens cam pin 17a of the third lens frame 16 is fitted. The second-lens drive plate 35 and third-lens drive plate 36; are coaxially pivoted to the first mother plate 31 through a common shaft 37. The second-lens drive plate 35 and the third-lens drive plate 36 are relatively rotatable and lie in parallel planes at different heights. The second lens cam pin 16a and the third lens cam pin 17a are always pressed against the rear surfaces (adjacent to the CCD 18) of the cam grooves 35a and 36a by the tension springs 16b and 17b to eliminate backlash, respectively.

A gear mechanism 38 which transmits the rotation of the second lens pulse motor M2 to the second lens drive plate 35, a gear mechanism 39 which transmits the rotation of the third lens motor M3 to the third lens drive plate 36, and a potentiometer (variable resistor) 40 are provided between the first and second mother plates 31 and 32. A first gear 38a secured to the output shaft of the second lens pulse motor M2 is functionally connected to a sector gear 35b formed on the outer peripheral surface of the second lens drive plate 35 through a second gear 38b, a third gear 38c, a fourth gear 38d and a fifth gear 38e. Each of the gears from the second gear 38b through to the fifth gear 38e are double gears having a pair of coaxial spur gears. The terminal gear 38e of the gear mechanism 38 which is in mesh with the sector gear 35b and the terminal gear 39f of the gear mechanism 39 which is in mesh with the sector gear 36b are located on opposite sides (front and rear sides) of the common shaft 37 in the optical axis direction.

A first gear 39a secured to the output shaft of the third lens motor M3 is functionally connected to a sector gear 36b formed on the outer peripheral surface of the third-lens drive plate 36 through a second gear 39b, a third gear 39c, a fourth gear 39d and a fifth gear 39e. Each of gears from the second gear 39b through to the fifth gear 39e are double gears having two spur gears in different axial positions. The fifth gear 39e is in mesh with a fifth gear 39f of the gear mechanism 39 and with a rotatable brush gear 40a of the volume mechanism 40. The brush gear 40a is provided on the rear surface thereof with a brush 40b secured thereto. A resistor plate 40c is secured to the rear body 13 independently of the lens drive unit 30 (before the lens drive unit 30 is attached), so that the resistor 40c comes into contact with the brush 40b. The resistance between two terminals 40d and 40e of the resistor plate 40c varies in accordance with the angular position of the brush gear 40a, and hence, the resistance corresponding to the angular position of the third-lens drive plate 36, i.e., the absolute position of the third lens frame 17 (third lens group L3) can be obtained.

The second-lens drive plate 35 and the third-lens drive plate 36 are coaxially supported by the common shaft 37, as mentioned above. The profiles of the cam grooves 35a and 36a are such that when the second-lens drive plate 35 and the third-lens drive plate 36 rotate in the same direction, i.e., counterclockwise direction in FIG. 10, both the second lens frame 16 (cam pin 16a) and the third lens frame 17 (cam pin 17a) are moved forward. On the other hand, since the second lens frame 16 (second lens group L2) and the third lens frame 17 (third lens group L3) are moved in opposite directions when the focal length varies, as mentioned above, the directions of the rotation of the second-lens drive plate 35 and the third-lens drive plate 36 upon zooming are always opposite, e.g., when either the focal length is reduced from the telephoto extremity or the focal length is increased from the wide-angle extremity. With this arrangement, in which the second-lens drive plate 35 and the third lens drive plate 36 are rotatably mounted to the common shaft 37 and the rotation of the drive plates in opposite directions causes the second and third lens groups L2 and L3 to move in opposite directions, the lens barrel can be miniaturized.

Figure 12:
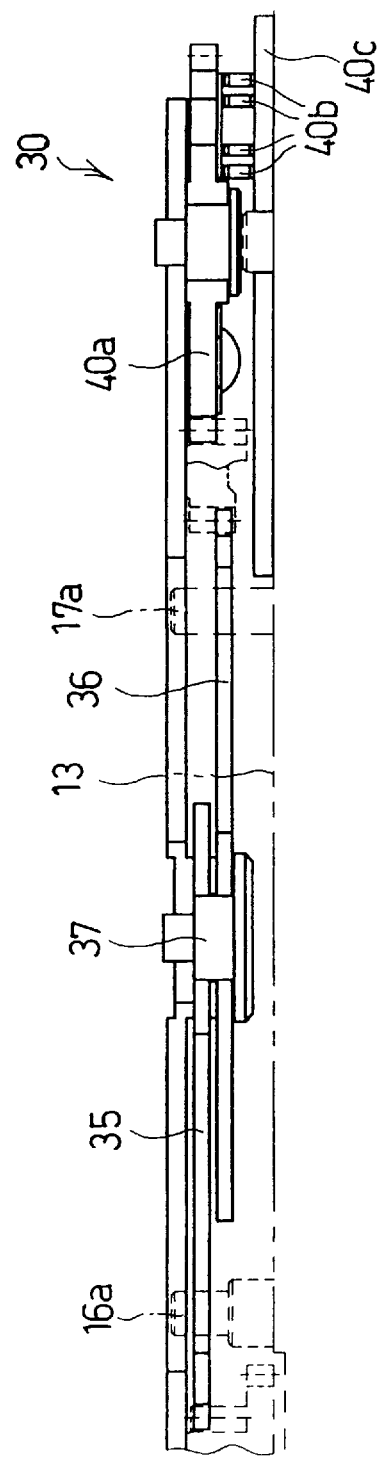
FIG. 12 is an end view viewed from the direction indicated by an arrow XII in FIG. 10.
Figure 13:
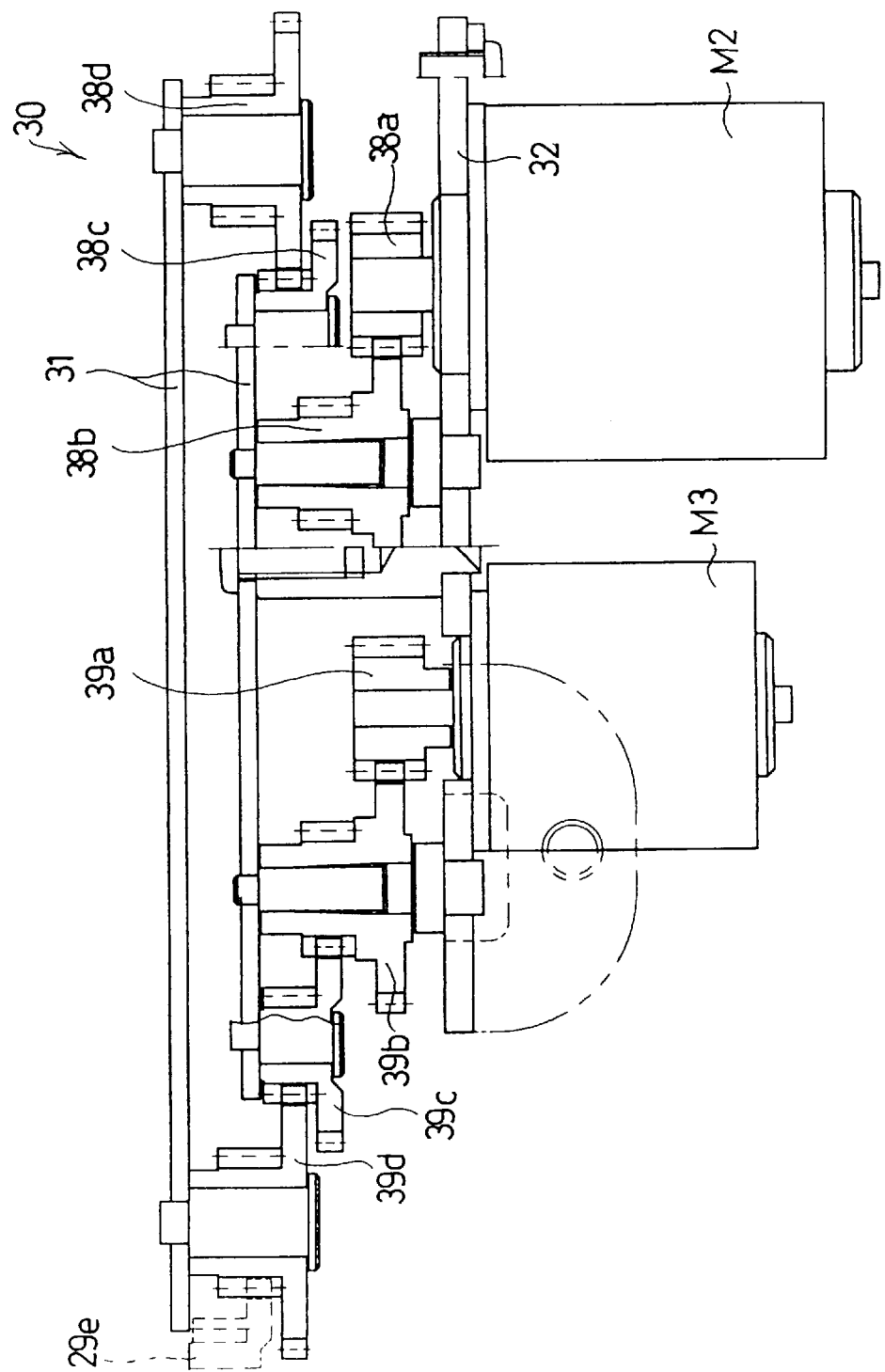
FIG. 13 is a sectional view taken along the line XIII—XIII in FIG. 10.
Figure 14:
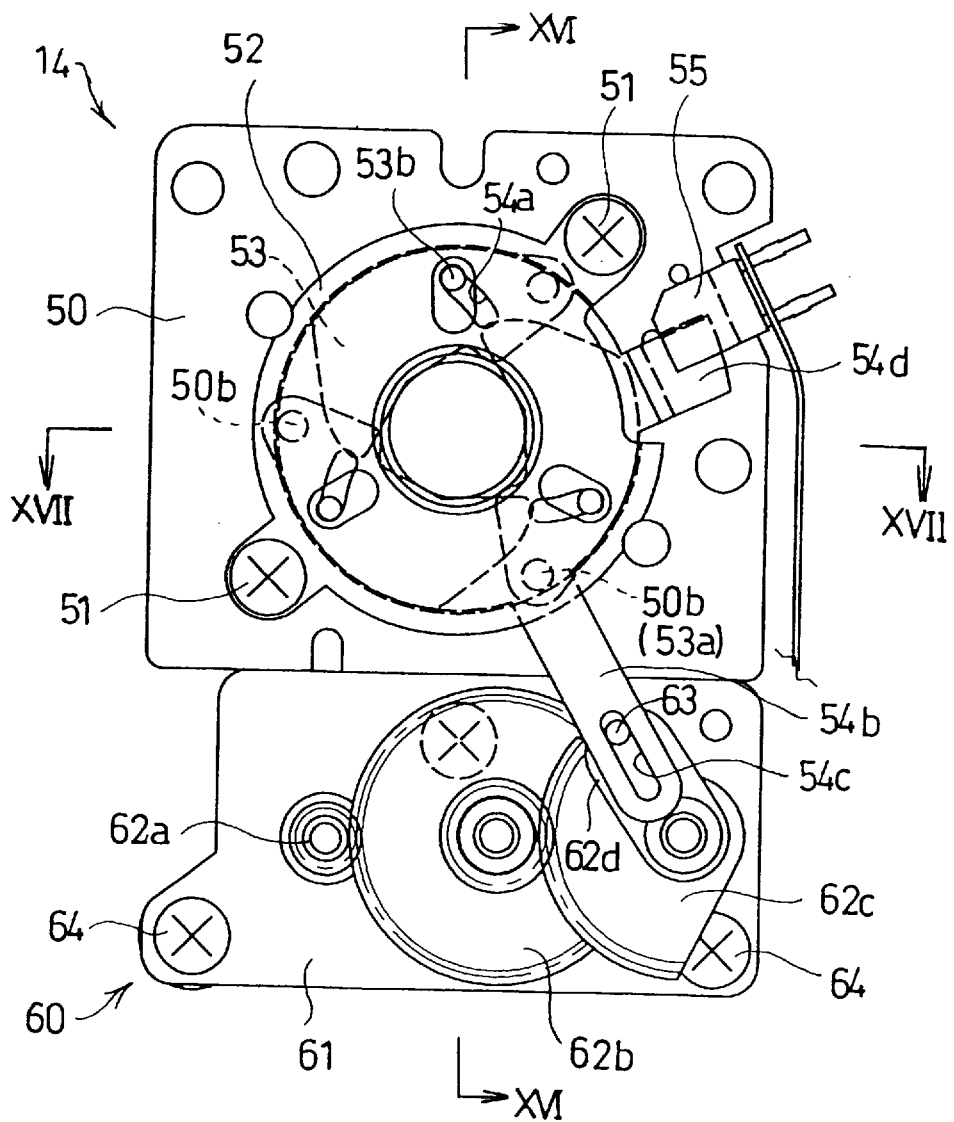
FIG. 14 is a front elevational view of a diaphragm drive unit in a full-open aperture position.
Figure 15:
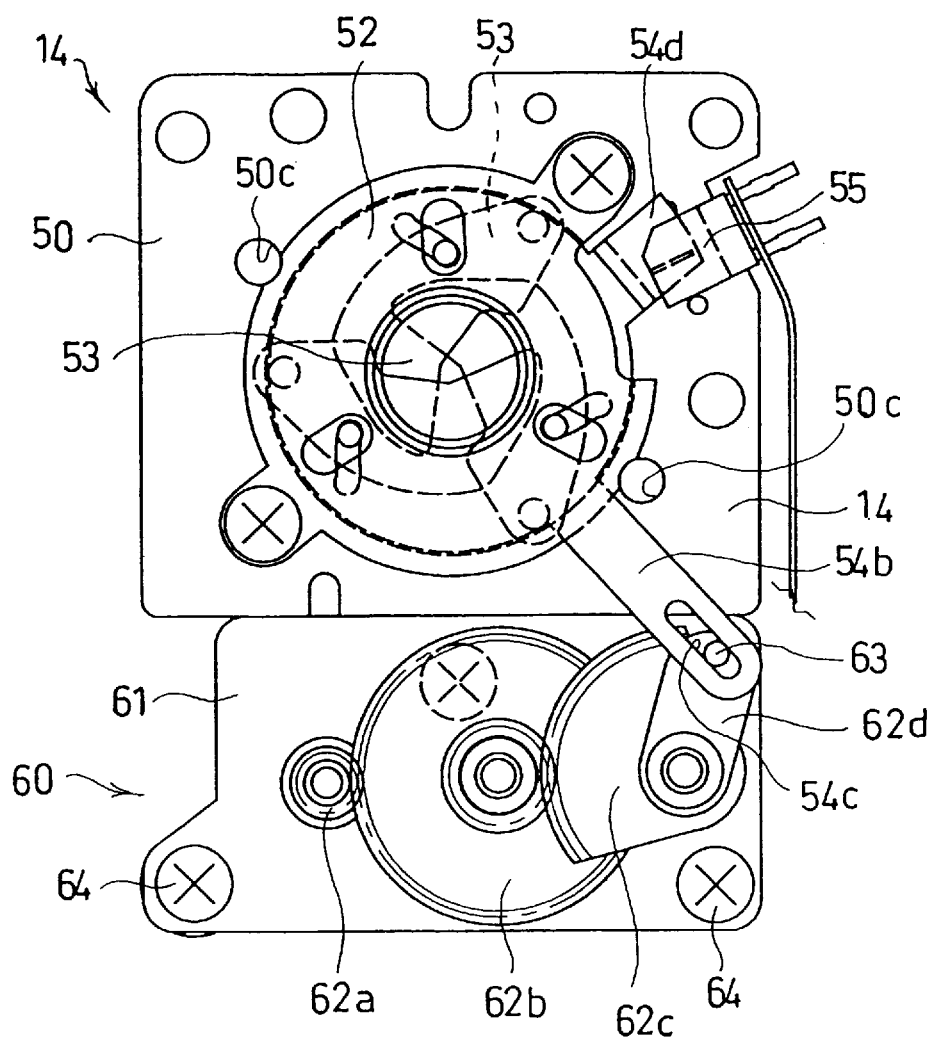
FIG. 15 is a front elevational view of a diaphragm drive unit in a minimum aperture position.
Figure 16:
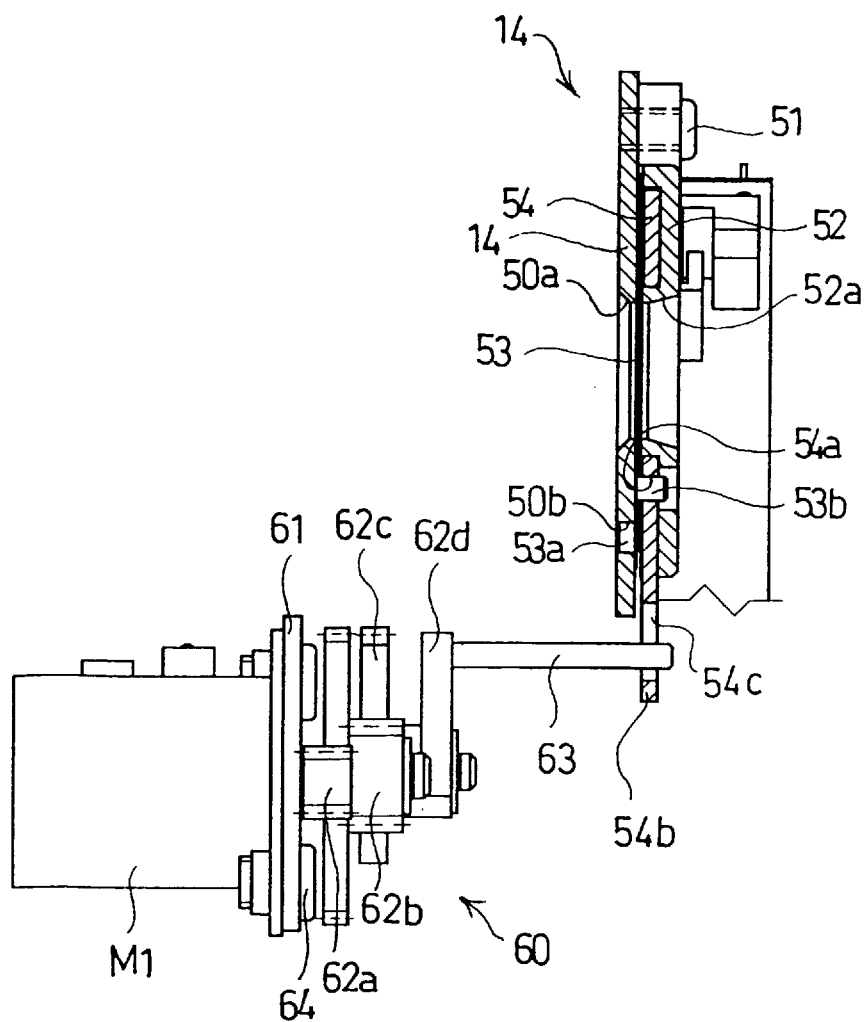
FIG. 16 is a sectional view taken along the line XVI—XVI in FIG. 14.
Figure 17:
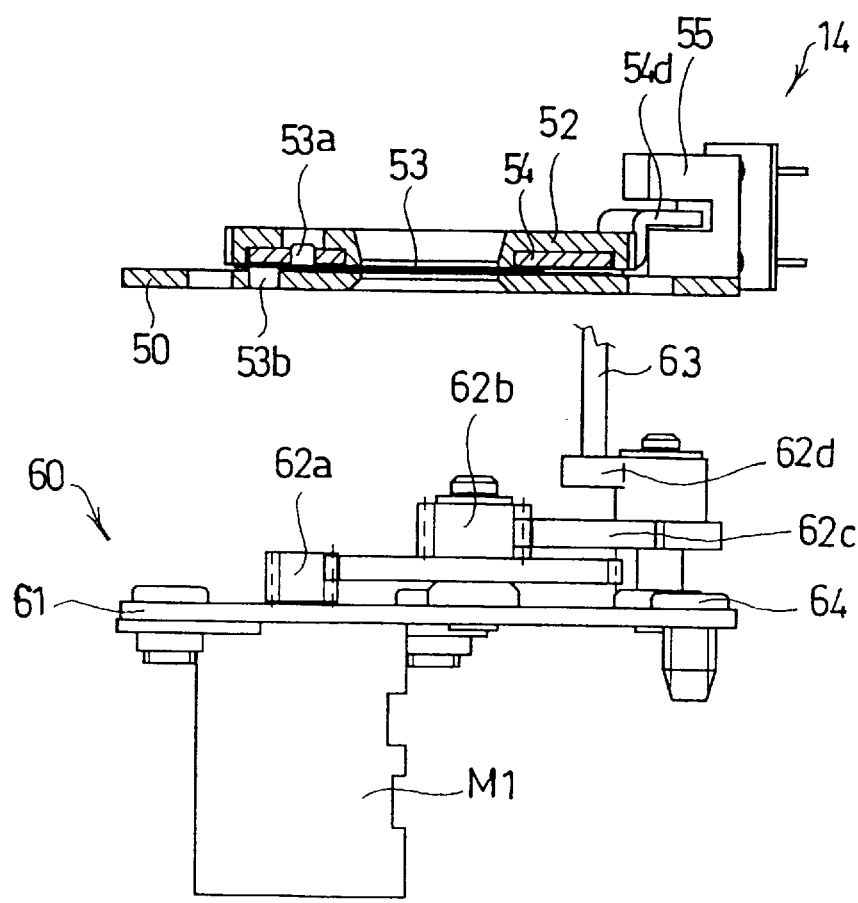
FIG. 17 is a sectional view taken along the line XVII—XVII in FIG. 14.

The second-lens drive plate 35 and the third lens drive plate 36 are each made of a plate and are located at slightly different positions in the axial direction of the common shaft 37, as can be seen in FIGS. 10 and 12. The drive plates 35 and 36 are in the form of a generally sectoral shape to reduce the weight and size. If the drive plates 35 and 36 can be each made of a circular plate (disc shape), no interference between the drive plates will occur in any angular positions. However, since the drive plates 35 and 36 are each in the shape of generally sectional shape, there is a possibility that they might interfere with each other at the front end surfaces thereof in the thickness direction, depending on the angular position, when the sector member deforms in the thickness direction.

To prevent possible interference, the second-lens drive plate 35 and the third-lens drive plates 35 and 36 are provided on the front ends thereof with wing portions 35c and 36c which overlap (in a plan view) when the maximum angular displacement of the drive plates 35 and 36 in opposite directions takes place. FIG. 10 shows a wide-angle position in which the second-lens drive plate 35 is rotated by the maximum angular displacement in the counterclockwise direction, and the third-lens drive plate 36 is rotated by the maximum angular displacement in the clockwise direction, respectively. In this state, the wing portions 35c and 36c overlap (in a plan view). In other words, the drive plates 35 and 36 are each made of a generally sectoral shape plate which is made as small as possible, and are provided on the front ends thereof with the wing portions 35c and 36c which partly overlap in a plan view in any angular position of the lens drive plates 35 and 36. Thus, a smooth rotation of the lens drive plates 35 and 36 can be ensured over the entire angular displacement.

The lens drive unit 30 (except for the resistor plate 40c) as constructed above is formed as a separate unit from the lens barrel body 10. The resistor plate 40c is secured to the rear body 13 by means of a plurality of screws 41, and thereafter, the lens drive unit 30 is secured to the lens barrel body 10 (front body 12 and rear body 13) by means of a plurality of screws 42.

The diaphragm block 14 held between the front body 12 and the rear body 13 and the drive unit 60 thereof is explained below with reference to FIGS. 14 through 17. A substrate 50 of the diaphragm block 14, and a retainer 52 secured to the diaphragm block 14 by screws 51, are provided with apertures 50a and 52a on the optical axis, respectively. The substrate 50 is provided with a plurality of holes 50b formed around the aperture 50a at equi-angular intervals, in each of which one of a pair of dowels 53b of diaphragm blades 53 is inserted. An opening and closing ring 54 is rotatably provided between the substrate 50 and the retainer 52. The opening and closing ring 54 is provided with a plurality of cam holes 54a at equi-angular to intervals (the same interval as the holes 50b) in each of which the other of a pair of the dowels 53b of the diaphragm blade 53 is fitted. In the above-mentioned diaphragm mechanism (which is per se known), when the opening and closing ring 54 is rotated, the size of the aperture defined by the blades 53 is varied between the full-open position (maximum aperture) and the smallest aperture (minimum aperture).

The opening and closing ring 54 is provided with a radially extending diaphragm opening and closing arm 54b which is in turn provided with a radially extending association groove 54c. The photodetector (origin sensor) 55 which detects the origin of the diaphragm mechanism is secured to the diaphragm block 14. The substrate 50 is provided with a tab 54d projecting therefrom, corresponding to the photodetector 55. In the illustrated embodiment, the tab 54d interrupts light from the photodetector 55 when the opening and closing ring 54 is rotated to the full-open position of the diaphragm (aperture). The diaphragm value (angular displacement of the opening and closing ring 54) when the aperture size is reduced from the full-open position by the opening and closing ring 54 is detected by the lens controller 70 (FIG. 18) which controls the number of driving pulses of the diaphragm pulse motor M1. Alternatively, it is possible to control the displacement from the origin (i.e., the diaphragm value) using a pulser instead of the pulse motor M1.

The drive unit 60 as a separate unit is secured to the rear body 13 at a position different from the substrate 50 of the diaphragm block 14 in the optical axis direction and radial direction. The diaphragm pulse motor M1 is secured to the substrate 61 of the drive unit 60. A first gear 62a secured to the output shaft of the diaphragm pulse motor M1 is connected to the sector gear 62c through a second gear 62b. The sector gear 62c is provided with a radial arm 62d integral therewith, which is in turn provided with an association pin 63 which is fitted in the radial association groove 54c of the opening and closing ring 54. The second gear 62b is a double gear having a pair of coaxial spur gears.

The diaphragm block 14 and the drive unit 60 are each pre-assembled as a unit. The substrate 50 of the diaphragm block 14 is held between the front and rear bodies 12 and 13. The substrate 61 of the drive unit 60 is secured to the rear body 13 by means of a plurality of screws 64, so that the association pin 63 is fitted in the radial association groove 54c of the opening and closing ring 54 and one end of the substrate 61 is held in a holding groove 65 (FIG. 8) of the rear body 13.

Figure 18:
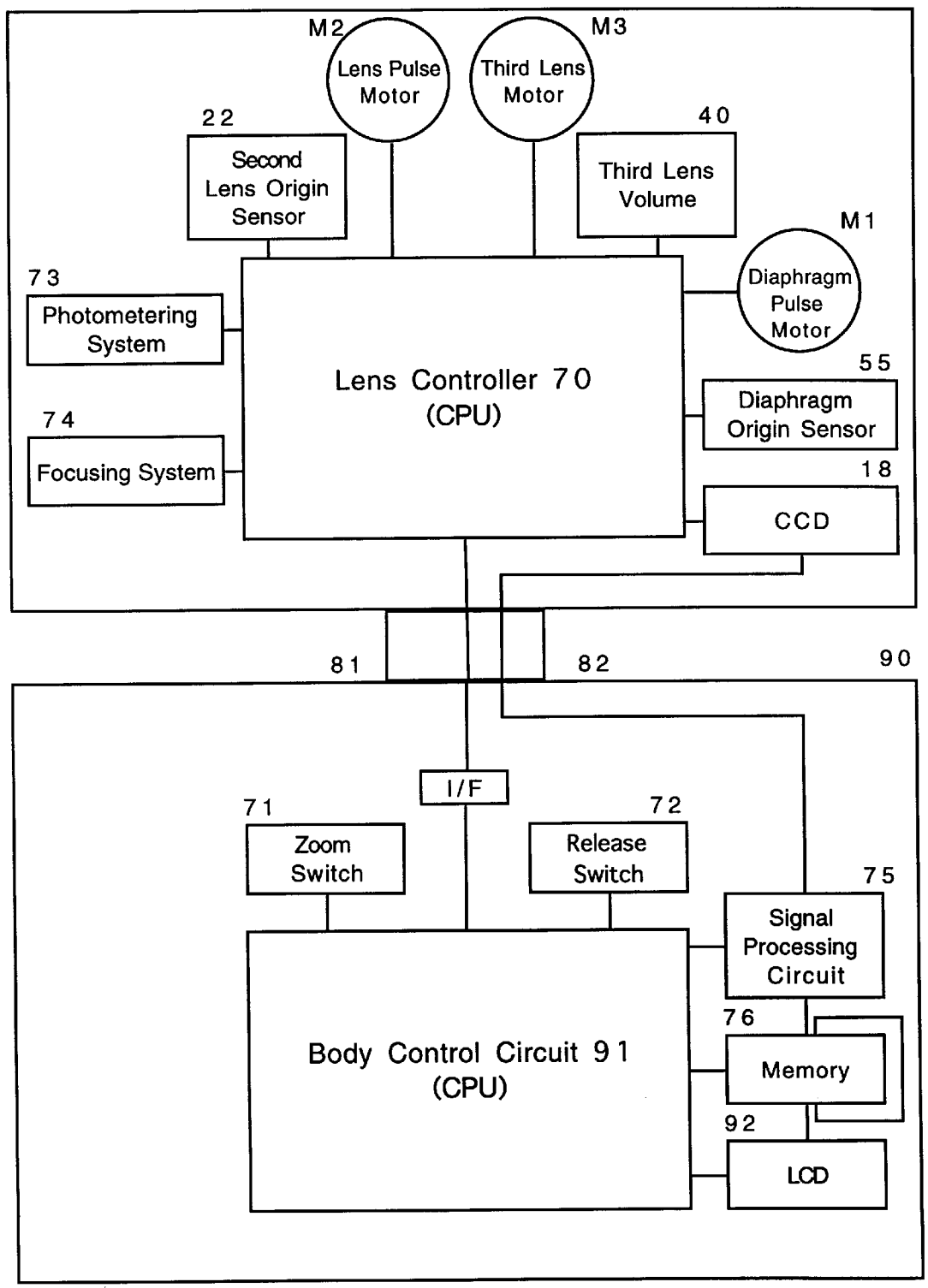
FIG. 18 is a block diagram of a control system in a zoom lens barrel according to the present invention.

FIG. 18 shows a control system of the zoom lens barrel constructed above. Connected to the lens controller (CPU) 70 are the diaphragm pulse motor M1, the second lens pulse motor M2, the third lens motor M3, the third lens volume 40, the diaphragm origin detector 55, the CCD 18, a zoom switch 71, a release switch 72, a photometering device 73, an object distance detecting device 74 and an EEPROM. In general, the CCD 18 can constitute the photometering device 73. The object distance detecting device 74 can be either of a passive type or an active type. In the embodiment illustrated in FIGS. 1 through 3, the object distance detecting device 74 is a passive system. Image data formed on the CCD 18 is converted to an electric signal which is recorded in the memory 76 through the signal processing circuit 75.

The lens casing 11 is connected to the body casing 90 through the cylindrical boss (cylindrical portion) 81 (FIGS. 1 and 2) at the substantially center portion so as to rotate by an angle less than 270°. The body casing 90 is equipped with a body CPU 91, the zoom switch 71, the release switch 72, the signal processing circuit 75 for processing the image signals of the CCD 18, the memory 76, a liquid crystal display (LCD) panel with a finder function, (e.g. in which the object image formed on the CCD 18 is displayed), and various switches, etc. The electric or electronic circuits (elements) within the body casing are connected to the electric or electronic circuits (elements) within the lens casing 11 through a body-lens connecting FPC board (flexible printed circuit board) 82 which extends through the cylindrical boss 81.

Specifically, the body-lens connecting FPC board 82 which extends in the cylindrical boss 81 and enters the lens casing 11 is connected to a connector 83 provided on the substrate 20 and a connector 85 provided on the lens FPC board 84. The substrate 20 is provided thereon with the CCD 18 and the lens FPC board 84 is provided with a printed circuit to which other electrical elements within the casing 11 are all connected and electronic devices such as the lens CPU 70, etc., are connected. Note that the power supply to the drive motors M1, M2, M3 of the zoom lens barrel is effected by a battery provided in the body casing 90 through power supply lines (not shown).

Figure 1:
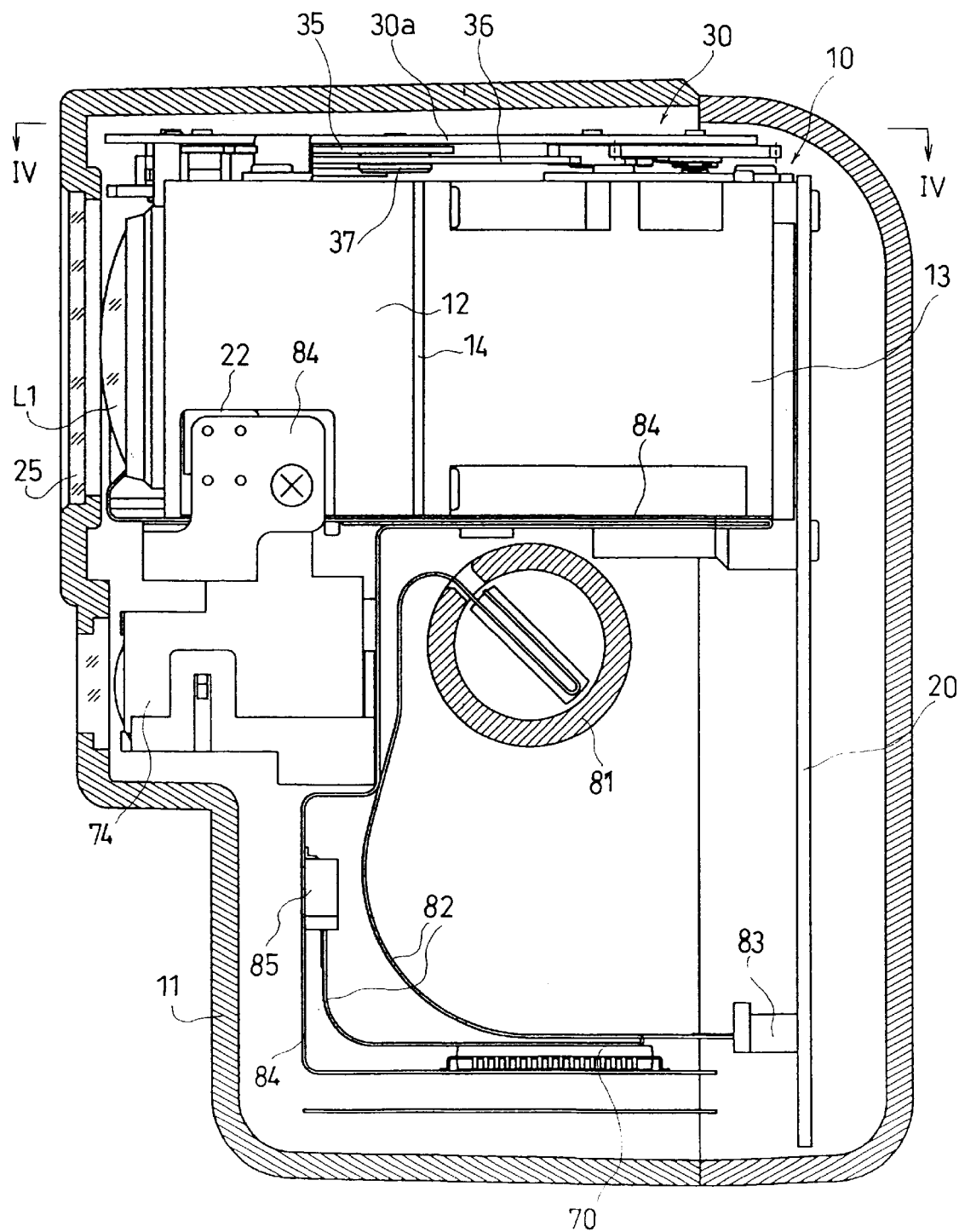
FIG. 1 is a left side view of a zoom lens barrel in which the casing is sectioned.
Figure 2:
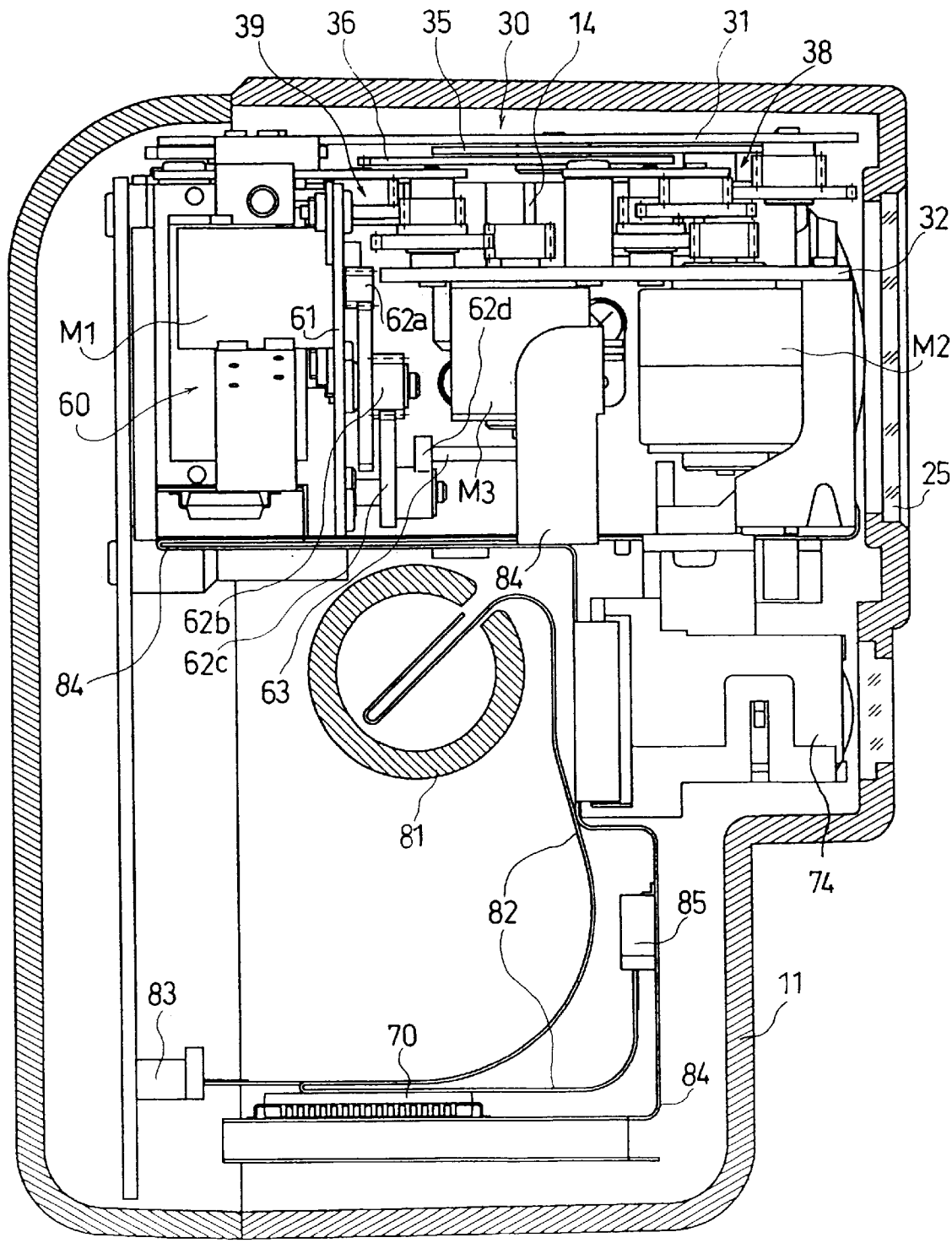
FIG. 2 is a right side view of FIG. 1.
Figure 3:
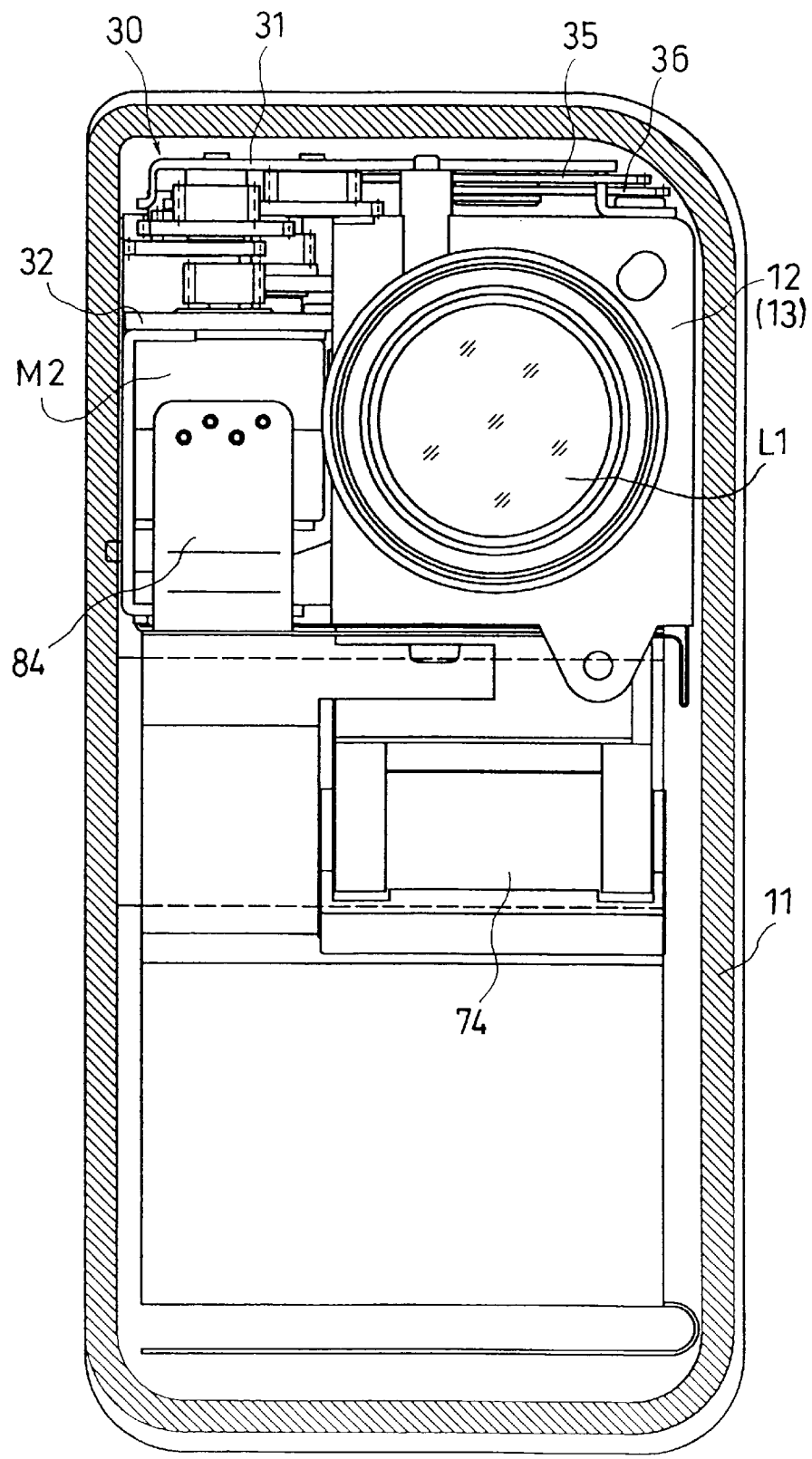
FIG. 3 is a front elevational view of FIG. 1.

As can be seen in FIG. 1, the barrel body 10, the drive mechanism including the motors M1, M2, M3 and the CCD 81 are located on the side of the cylindrical boss 81 opposite to the lens CPU 70. Namely, in FIG. 1, in which the lens casing 11 is in the standard angular position in which the optical axis of the zoom lens extends in the horizontal direction, the barrel body 10, the drive mechanism including the motors M1, M2 and M3 and the CCD 18 are located above a straight line (or plane) passing through the center of the cylindrical boss 81, the lens CPU 70 is located below the cylindrical boss 81, and the lens CPU 70 is located below the straight line (or plane). Consequently, the connectors 83 and 85 are located below the straight line (plane). The substrate 20 lies in a plane perpendicular to the straight line (plane) extending from top to bottom.

Thus, the components such as the motors associated with the drive system in the barrel body 10 are located above the cylindrical boss 81 and the lens CPU 70 is located below the cylindrical boss 81, respectively, and hence, no mal-function of the lens CPU 70 (which tends to be influenced by electrical noise) occurs. A space surrounded by the lens FPC board 84, the substrate 20 and the cylindrical boss 81 provides enough volume for moving the body-lens connecting FPC board 82 when the FPC varies the shape thereof in accordance with the rotation of the lens unit and the camera unit, preventing noise from occurring in the lens CPU thereby.

The basic operation of the zoom lens barrel constructed as above operates as follows.

At the wide-angle extremity shown in FIG. 7, if the zoom switch 71 is operated toward the wide-angle position, the second lens frame 16 (second lens group L2) is moved forward through the second lens pulse motor M2, the gear mechanism 38 and the second-lens drive plate 35, and the third lens frame 17 (third lens group L3) is moved rearward through the third lens motor M3, the gear mechanism 39 and the third-lens drive plate 36, respectively. Similarly, if the zoom switch 71 is operated toward the telephoto position at the telephoto extremity shown in FIG. 6, the second lens frame 16 (second lens group L2) is moved rearward and the third lens frame 17 (third lens group L3) is moved forward. Information concerning the displacement of the second lens frame 16 from the origin is determined by the number of driving pulses of the second lens pulse motor M2 and fed from the lens controller 70, and the position information of the third lens frame 17 is determined based on position data detected by the third lens potentionmeter 40. It is not always necessary to focus on the object or prevent the shift of focus from occurring during the zooming operation.

The position of the third lens group L3 detected by the third lens volume 40 is an absolute value, and hence the set focal length is determined with reference to the position of the third lens group. When the operation force of the zoom switch 71 is released, it does not matter if the focus condition is out of focus.

When the release switch 72 is depressed by half a step, the photometering device 73 and the object distance detecting device 74 are activated to obtain object brightness data and object distance data. When the release switch 72 is depressed by a full step, the image pickup operation is carried out by the CCD 18. Before the release switch 72 is fully depressed, the diaphragm value is set in accordance with the object brightness data detected by the photometering device 73 by the diaphragm pulse motor M1, the diaphragm origin sensor 55 and the lens controller 70; the second lens group L2 is moved to a in-focus position in accordance with the set focal length data and the object distance data detected by the object distance detecting device 74, the second lens pulse motor M2, the second lens origin sensor 22 and the lens controller 70. Namely, when the absolute position of the third lens group L3 is determined in accordance with the focal length set by the zoom switch 71, the position of the second lens group L2 can be determined in accordance with the set focal length and the object distance data detected by the object distance detecting device 74. Thus, an in-focus object image is formed on the CCD 18, so that the image pickup operation can be carried out.

According to the present invention, in a zoom electronic camera in which the lens casing is rotatably connected to the body casing and the lens casing is provided therein with a lens CPU, since the lens CPU and the components associated with the zoom lens having the drive mechanism including the motors, etc., that cause electrical noise are located on opposite sides of the hollow shaft (cylindrical portion) about which the relative rotation of the lens casing and the body casing occurs, the lens CPU can be spaced from the source of noise, thus resulting in no malfunction thereof.

What is claimed is:

1. A zoom electronic camera comprising:
   a lens casing which contains therein a zoom lens having at least two movable lens groups, a drive mechanism including a motor for driving the movable lens groups, a solid state image pickup device which picks up an object image through the zoom lens, and a lens CPU which controls the drive mechanism including the motor; and
   a body casing which contains therein a signal processing circuit which processes an image signal supplied from the solid state image pickup device, the body casing being relatively rotatably connected to the lens casing through a cylindrical portion about which the relative rotation takes place;

wherein, in said lens casing, the zoom lens, the drive mechanism including the motor and the solid state image pickup device are located on an opposite side of the cylindrical portion from the lens CPU.

2. A zoom electronic camera according to claim 1, wherein sufficient space is provided between said cylindrical portion and said lens CPU to move a body-lens casing connecting flexible printed circuit board when the shape of said flexible printed circuit board varies in accordance with a relative movement of said lens casing and said body casing.

3. A zoom electronic camera according to claim 1, wherein the zoom lens, and the drive mechanism including the motor and the solid state image pickup device are located above the cylindrical portion and the lens CPU is located below the cylindrical portion.

4. A zoom electronic camera according to claim 1, wherein the cylindrical portion is provided with a body-lens casing connecting flexible printed circuit board extending therethrough, said flexible printed circuit board electrically connected electrical elements within the lens casing and electrical elements within the body casing.

5. A zoom electronic camera according to claim 3, wherein the body-lens casing connecting flexible printed circuit board extending through the cylindrical portion is connected to the lens CPU, the solid state image pickup device and a drive circuit of the motor in the lens casing.

6. A zoom electronic camera according to claim 4, wherein the lens casing is provided therein with an internal lens flexible printed circuit board and a substrate on which the solid state image pickup device is mounted, said body-lens connecting flexible printed circuit board being connected to the internal lens flexible printed circuit board and the substrate through respective connectors.

7. A zoom electronic camera according to claim 5, wherein the respective connectors of the substrate and the internal lens flexible printed circuit board are located on a same side of the cylindrical portion as the lens CPU.

* * * * *